(12) United States Patent
Shields et al.

(10) Patent No.: US 11,424,838 B2
(45) Date of Patent: Aug. 23, 2022

(54) QUANTUM COMMUNICATION NETWORK

(71) Applicant: Kabushiki Kaisha Toshiba, Minato-ku (JP)

(72) Inventors: Andrew James Shields, Cambridge (GB); Zhiliang Yuan, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 570 days.

(21) Appl. No.: 16/433,647

(22) Filed: Jun. 6, 2019

(65) Prior Publication Data

US 2019/0379463 A1 Dec. 12, 2019

(30) Foreign Application Priority Data

Jun. 8, 2018 (GB) ..................................... 1809496

(51) Int. Cl.
*H04B 10/70* (2013.01)
*H04B 10/85* (2013.01)
(Continued)

(52) U.S. Cl.
CPC .............. *H04B 10/85* (2013.01); *H04B 10/70* (2013.01); *H04L 9/0855* (2013.01); *H04Q 11/0005* (2013.01); *H04Q 11/0066* (2013.01); *H04Q 2011/0016* (2013.01); *H04Q 2011/0058* (2013.01)

(58) Field of Classification Search
CPC ...................................................... H04B 10/70
See application file for complete search history.

(56) References Cited

U.S. PATENT DOCUMENTS

2005/0286723 A1 12/2005 Vig et al.
2008/0175385 A1* 7/2008 Lee .................. H04B 10/70
380/256

(Continued)

FOREIGN PATENT DOCUMENTS

GB 2534918 8/2016
JP 2007-53591 A 3/2007
(Continued)

OTHER PUBLICATIONS

Examinatin Report under Section 18(3) dated Dec. 8, 2020 in corresponding United Kingdom Patent Application No. 1809496.1, 3 pages.

(Continued)

*Primary Examiner* — Shi K Li
(74) *Attorney, Agent, or Firm* — Oblon, McClelland, Maier & Neustadt, L.L.P.

(57) ABSTRACT

A node for a quantum communication network, said node comprising:
  a quantum transmitter, said quantum transmitter being adapted to encode information on weak light pulses;
  a quantum receiver, said quantum receiver being adapted to decode information from weak light pulses;
    at least three ports adapted to communicate with at least one other node; and
  an optical switch,
  said optical switch being configured to selectively connect the quantum transmitter and receiver to the ports such that the switch controls which of the ports is in communication with the quantum transmitter and quantum receiver.

17 Claims, 9 Drawing Sheets

(51) Int. Cl.
*H04L 9/08* (2006.01)
*H04Q 11/00* (2006.01)

(56) References Cited

U.S. PATENT DOCUMENTS

| | | |
|---|---|---|
| 2008/0292095 A1 | 11/2008 | Vig et al. |
| 2014/0341575 A1 | 11/2014 | Choi et al. |
| 2016/0248581 A1 | 8/2016 | Fu et al. |
| 2019/0170946 A1* | 6/2019 | Tu .......................... G02B 6/35 |
| 2019/0260667 A1* | 8/2019 | Aguado Martin .... H04L 9/0825 |
| 2021/0385079 A1* | 12/2021 | Curty Alonso ....... H04L 9/0643 |

FOREIGN PATENT DOCUMENTS

| | | |
|---|---|---|
| JP | 2008-504791 A | 2/2008 |
| JP | 2008-505590 A | 2/2008 |
| JP | 2014-225865 A | 12/2014 |
| JP | 2018-502514 A | 1/2018 |
| WO | WO 2006/01 4298 A2 | 2/2006 |
| WO | WO 2018/224164 A1 | 12/2018 |
| WO | WO-2018224164 A1 * | 12/2018 ........... H04L 9/0855 |

OTHER PUBLICATIONS

British Examination Search Report dated Nov. 23, 2018 in British Application 1809496.1, filed on Jun. 8, 2018.
Polatis series 6008i Instrumentation optical switch data sheet, Achieve More with Optical Switching™, 2017, 2 pages.
DiCon MEMS optical switch data sheet (SCD-0352A), "96X96 MEMS 3D Matrix Optical Switch", 2018, 2 pages.
Japanese Office Action dated Jun. 23, 2020 in Japanese Patent Application No. 2019-106381 (with unedited computer generated English translation, 11 pages.

* cited by examiner

QUANTUM COMMUNICATION NETWORK

FIELD

Embodiments described herein relate to quantum communication networks and apparatus for quantum communication networks.

BACKGROUND

In a quantum communication system, information is sent between a transmitter and a receiver by encoded single quanta, such as single photons. Each photon carries one bit of information encoded upon a property of the photon, such as its polarization, phase or energy/time. The photon may even carry more than one bit of information, for example, by using properties such as angular momentum.

Quantum key distribution (QKD) is a technique which results in the sharing of cryptographic keys between two parties: a transmitter often referred to as "Alice"; and a receiver often referred to as "Bob". The attraction of this technique is that it provides a test of whether any part of the key can be known to an unauthorised eavesdropper, often referred to as "Eve". In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

Such quantum transmitters and receiver can be networked together to form a mesh quantum communication network. In such a network, each connection will be fixed between a transmitter and its corresponding receiver such that only one transmitter will communicate with only one receiver. Thus, at nodes in the network, there will be multiple transmitter and receivers in the same node to handle each connection to the node.

BRIEF DESCRIPTION OF THE FIGURES

Devices and methods in accordance with non-limiting embodiments will now be described with reference to the accompanying figures in which.

DETAILED DESCRIPTION OF THE FIGURES

In an embodiment, a node for a quantum communication network is provided, said node comprising:
- a quantum communication unit, said quantum communication unit being adapted to encode quantum information on light pulses;
- an optical switch with at least one input port connected to the quantum communication unit and at least two output ports,
- said optical switch being configured to controls which of the output ports is connected to the quantum communication unit.

In a further embodiment a node for a quantum communication network is provided, said node comprising:
- a quantum transmitter, said quantum transmitter being adapted to encode information on weak light pulses;
- a quantum receiver, said quantum receiver being adapted to decode information from weak light pulses;
  - at least three ports adapted to communicate with at least one other node; and
- an optical switch,
- said optical switch being configured to selectively connect the quantum transmitter and receiver to the ports such that the switch controls which of the ports is in communication with the quantum transmitter and quantum receiver.

In a first embodiment, the optical switch comprises a first optical switch and a second optical switch,
- wherein the first optical switch is an 1×N switch where N is an integer of at least 2, where a single input can be selectively coupled to one of N outputs, the single input being adapted to receive a signal from the quantum transmitter and the N outputs coupled to one of the said ports,
- wherein the second optical switch is an M×1 switch where M is an integer of at least 2, where a single output can be selectively coupled to one of M inputs, the single output being adapted to direct a signal to the quantum receiver and the M inputs each coupled to one of the said ports.

In a second embodiment, the optical switch is 2×P switch where P is an integer of at least 3, the optical switch having a first interface that has two ports and a second interface that has P ports, the first interface having one port that is adapted to receive a signal from the quantum transmitter and a second port that is adapted to output a signal towards the quantum receiver, the first and second ports of the first interface being switchably connected to any of the ports of the second interface.

In a yet further embodiment, wherein the optical switch is R×Q switch where R is an integer of at least 4 and Q is an integer of at least 2, the optical switch having a first interface that has R ports and a second interface that has Q ports, the first interface having one port that is adapted to receive a signal from the quantum transmitter and a second port that is adapted to output a signal towards the quantum receiver, the first and second ports of the first interface being switchably connected to any of the ports of the second interface.

It is possible for the optical switch to provide a bypass channel wherein two of the ports on the first interface are connected such that a signal received at first port on the second interface can be directed via the connected ports on the first interface to a second port on the second interface.

In an embodiment, said optical switch has a loss of 6 dB or less. The optical switch may be a software controlled optical switch. The optical switch may be a so-called "beam steered" optical switch where the optical switch is adapted to selectively couple the quantum transmitter and receiver to the ports of the node via beam steering. In a further embodiment the optical switch may be a MEMs optical switch.

In some embodiments, the node may need to handle a combination of quantum and classical data. Thus, the node may further comprise a wavelength division multiplexer, said wavelength division multiplexer provided to separate an incoming signal into a quantum signal to be directed towards the optical switch and a classical signal to be directed to a component other than the optical switch. The wavelength division multiplexer might also be may be provided to combine an incoming quantum signal from the optical switch and a classical signal from a component other than the optical switch.

As noted above, the nodes can be used a quantum communication network, said network comprising a first node and at least two other nodes, wherein the first node has at least two links to other nodes, the two links being connected to the optical switch of the first node such that signals transmitted over the two links are switchably connected to the same quantum receiver and transmitter.

Such a network may further comprise a network controller adapted to use time sharing to prevent signals travelling through said network from clashing. The network controller may be adapted to use time sharing to allow signals that have been designated to be important to travel quicker through said network than other signals.

Using the above agile switchable network also provides advantages for security. The network controller may be adapted to direct a signal relating to a first quantum key from a source node to a destination node via a first set of nodes and to direct a signal relating to a second quantum key from the source node to the destination node via a second set of nodes, the first set of nodes being different to the second set of nodes, wherein a final key is produced that is a combination of the first and second keys.

In a further embodiment, a secure transmission of a key is realised by a quantum communication network, wherein the network controller is adapted to direct a signal relating to a quantum key from a source node to a destination node,
  the source node and the destination node being separated by a sequence of N nodes, where N is an integer of at least 2,
  the controller being configured to:
    divide the quantum key into N parts; and
    send each part of the key via a subset of the sequence of N nodes
  wherein each subset consists of N−1 of the nodes, such that each part of the key bypasses at least one of the N nodes,
  wherein the key is produced by combining the N parts of the key.

In the above, the key prior to division may have a length KN. When the parts of the key are combined the final key length is K. The final key can be produced using bit-wise exclusively-or logical operation on all sub-keys.

As will be explained below, the optical switch allows different paths to be selected to achieve the subset of nodes above. Also, it is possible to provide a bypass in the node using the optical switch as will be explained with reference to FIG. 6 to produce a subset of nodes.

In a further embodiment, transmission of a key is realised by a quantum communication network, wherein the network controller is adapted to direct a signal relating to a quantum key from a source node to a destination node,
  the source node and the destination node being separated by a sequence of N nodes, where N is an integer of at least 3,
  the controller being configured to:
    divide the quantum key into M parts, where M is an integer and is less than N; and
    send each part of the key via a subset of the sequence of N nodes,
  wherein the key is produced by combining the M parts of the key.

Similar to the above, in an embodiment, the length of the key prior to division may be KM and the final key will have a length K.

In a further embodiment, a method for operating a node for a quantum communication network is provided, said node comprising:
  a quantum transmitter, said quantum transmitter being adapted to encode information on weak light pulses;
  a quantum receiver, said quantum receiver being adapted to decode information from weak light pulses; and
    at least three ports adapted to communicate with at least one other node; and
  an optical switch,
  wherein said method comprises operating said optical switch to selectively connect the quantum transmitter and receiver to the ports such that the switch controls which of the ports is in communication with the quantum transmitter and quantum receiver.

In a yet further embodiment, a method of operating a quantum communication network is provided,
  said network comprising a first node and at least two other nodes, wherein each node in operated as recited above,
  wherein the first node has at least two links to other nodes, the two links being connected to the optical switch of the first node such that signals transmitted over the two links are switchably connected to the same quantum receiver and transmitter.

Finally, a method of securely transmitting a key from a source node to a destination node is provided, wherein the source node and the destination node being separated by a sequence of N nodes, where N is an integer of at least 2,
  the method comprising:
    dividing the quantum key into N parts;
    sending each part of the key via a subset of the sequence of N nodes wherein each subset consists of N−1 of the nodes, such that each part of the key bypasses at least one of the N nodes; and
    combining the N parts of the key transmitted via the subsets of nodes to produce the key.

As explained above, the key may have a length of KN prior to division and the final key length after combining the N parts will be K.

Figure 1:
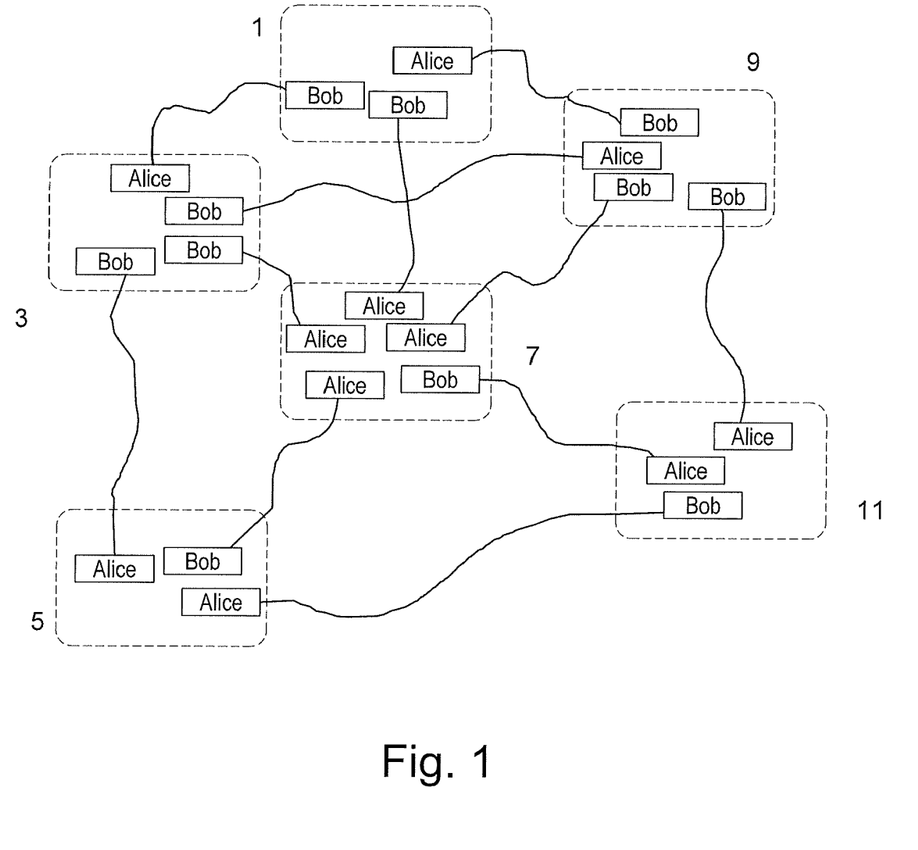
FIG. 1 shows a schematic illustration of a quantum communication network.

FIG. 1 is a schematic of a quantum communication network. The network comprises nodes 1, 3, 5, 7, 9, 11. Each node is connected to at least one other node. In the configuration of FIG. 1, communication takes place between two nodes when there is a transmitter in one node and a receiver in the other node. However, in the arrangement of FIG. 1, there is a single connection between each transmitter/receiver pair, such that each transmitter can only communicate with a single dedicated receiver.

For ease of language, the term quantum communication unit will be used to refer to either a quantum transmitter or a quantum receiver. Thus, if a node is connected to two other nodes, it must have a dedicated quantum communication unit at each end of the connection. Thus, every node has a number of quantum communication units that equals the number of connections to that node. Thus, there is a significant capital investment required to deploy a QKD network.

Also, in the above, there is limited room for network re-configurability once installation is complete In addition, in the network of FIG. 1, the QKD services cannot be dynamically balanced over the network because each link will unavoidably have different channel losses and therefore different secure key rate. Some links will have surplus and others deficiencies of key materials. The fixed links also do not provide a secure means to mitigate the potential compromise of an intermediate node. For example, a QKD communication chain, QKD(1)→QKD(3)→QKD(5)→QKD(7). If either node 3 or 5 is compromised, communication between nodes 1 and 7 will be insecure. Finally, such a network is not resilient to nodal QKD device failure.

Figure 2:
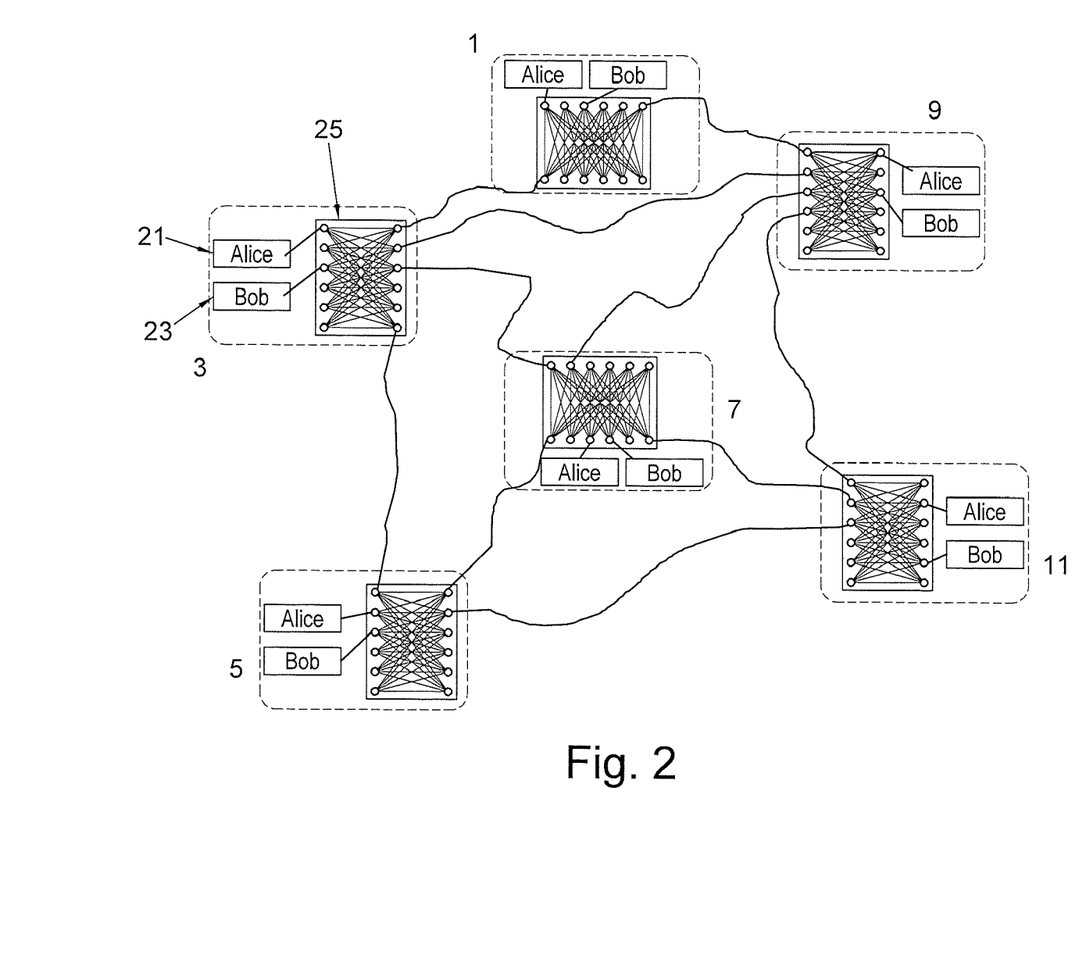
FIG. 2 shows a schematic of a quantum communication network in accordance with an embodiment.

FIG. 2 shows an "agile" quantum communication network in accordance with an embodiment.

To compare the network of FIG. 2 exactly that of FIG. 1, the same reference numerals have been used to denote the notes. However, the nodes of FIG. 2 are different to those of FIG. 1. As explained above, in FIG. 1, each node had a quantum communication unit corresponding to each connection. However, in FIG. 2, there is just a quantum transmitter (Alice, 21) and a quantum receiver (Bob, 23) in each node.

Details of possible forms of quantum transmitters and quantum receivers will be explained with reference to FIG. 8. However, in general, quantum transmitter will be capable of encoding information on weak light pulses. A quantum receiver will be capable of decoding this information. Either discrete variable (DV) or continuous variable (CV) quantum information can be encoded. In DV QKD, weak coherent light pulses (WCP) can be generally thought of as light pulses that have a probability of containing less than one photon per pulse on average during quantum encoding, the information is encoded on weak light pulses using polarisation, phase, and time-bin information etc. In CV-QKD, each WCP pulse can contain up to 100 photons per pulse on average.

In the above description, prepare-and-measure DV QKD systems based on WCP and single photon detection are described. However, the idea of using optical switching is applicable to all other types of QKD systems.

A prepare and measure DV QKD system consists of a QKD transmitter and a QKD receiver. The transmitter transmits an encoded quantum signal pulses, each of which contains on average less than one photon per pulse. These optical signals are transmitted through an optical fibre link before reaching the quantum receiver, who decodes the incoming signals and detect them using single photon detectors.

The embodiments described herein are not limited to a particular degree of freedom for encoding. In fact, encoding can be applied upon one of, or a mixture of, many different degrees of freedoms, such as phase, polarisation and time-bin etc.

Further, the embodiments described herein are not limited to a certain QKD protocol. It is applicable to different QKD protocol, such as BB84, B92, differential-phase-shift (DPS), coherent-one-way protocol and round-robin DPS protocols.

The quantum channel can be chosen to have any wavelength that is suitable for transmission over optical fibre channel which typically supports only one optical mode and is usually referred to as single mode fibre. For example, the quantum wavelength can be chosen at 1310 nm or at 1550 nm.

In some embodiments, for QKD operation, supporting classical optical channels are provided in order to realising functions of clock synchronisation and exchanging messages for sifting between the QKD transmitter and receiver. While these classical channels can be placed into a separate fibre, wavelength division multiplexing is often used to combine both these classical channels and quantum channel so that they can all be transmitted through the same fibre. In the case when multiplexing is used, the optical switches in embodiments are configured to switch all QKD signals. If two fibres are used for each QKD link, the optical switches are configured to switch both fibres in order for correct operation.

Figure 3:
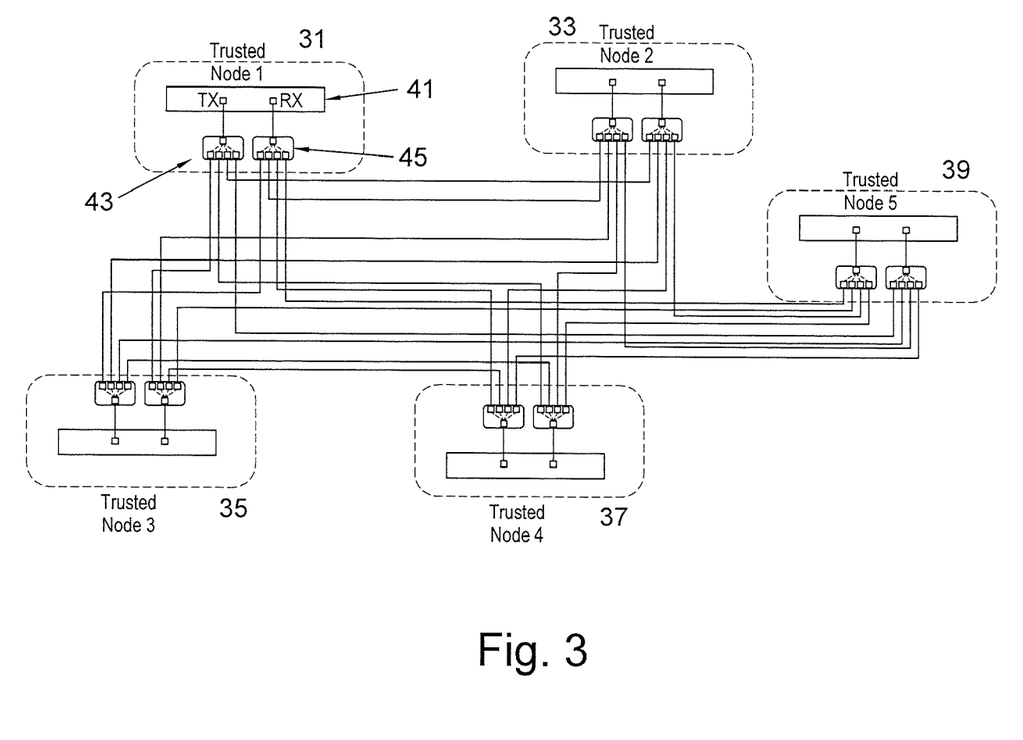
FIG. 3 shows a schematic of a quantum communication network in accordance with a further embodiment.

In some cases, QKD need to share the same fibre with additional data traffic in the same fibre. In this case, a wavelength filter may be used to combine/separate QKD signals (quantum, synchronisation and classical) and additional data signal (FIG. 3). It is preferable to assign a wavelength group to accommodate QKD optical signals, for example, a coarse-wavelength-division-multiplexing (CWDM) band within Telecom C-band.

Returning to the Example of FIG. 2, in addition to Alice 21 and Bob 23, each node comprises an optical switch 25. The optical switches shown in this example are N×N optical switches, and in this specific example N×N switches. However, other types of switches can be used.

Thus, in FIG. 2, each node just has a QKD transmitter and receiver pair. In this example, any to any link between QKD nodes is realised through N×N optical switches using time sharing to avoid clash between two signals traversing the switch at the same time.

In the network of FIG. 2, each node requires just one QKD transmitter and receiver pair, thereby easing the initial deployment cost of a QKD network. Also, further capacity requirement in future can be met by simply adding QKD transmitter-receiver pairs into a node.

The network of FIG. 2 is also easily reconfigurable. The QKD services can be balanced over the network by allocating higher time shares to mission critical links or channel with higher losses. Also, it is easy to add additional QKD node In the network of FIG. 2, there is a secure means to mitigate the potential compromise of an intermediate node. For example, to form a secure key between node 5 and node 9, it is possible to use optical switches to create different QKD routes: (i) node 5→node 3→node 9 and (ii) node 5→node 11→node 9. The two keys sent via different routes may be combined using XOR operation $K_i$ XOR $K_{ii}$. This way, a single node compromise will not prevent secure communication between Node 5 and Node 9. Alternatively, node 5 and node 9 can perform direct QKD communication by bypassing an intermediate node, e.g., node 7.

Finally, the network of FIG. 2 is resilient to nodal QKD device failure.

The above network uses an optical switch 25. In an embodiment, the optical switching loss is 6 dB or less.

Existing QKD systems have a maximum tolerable channel loss, a limit imposed by the detector dark noise and the exponential decay of the quantum signal strength in the optical fibre. The longer fibre link, the higher the channel loss and the lower the secure key rate. Therefore, in an embodiment, low-loss optical switches and wavelength filters are used in the optically switched QKD network.

A possible example of a suitable switch is a Series 6000i Optical Matrix Switch with available size from 4×4 up to 192×192 port. It is based on beam steering, and supports all wavelengths. It can also be configured to have N×M any-to-any port configuration. Typical insertion loss ranges from 0.5 dB to a maximum of 2.3 dB. It has support of Software-Defined Networks (SDNs) via embedded OpenFlow, NETCONF and RESTCONF control interfaces, the Series 6000i interfaces directly with cutting edge cloud-based network and infrastructure testing applications.

3D MEMS based switches can also be used. For example, 96×96 MEMS 3D Matrix optical switch from DiCon Fiberoptics, Inc. It has a typical switching loss of 1 dB.

FIG. 3 shows a schematic of a further "Agile" QKD network in accordance with an embodiment. The network of FIG. 3 differs from the network of figure in the type of optical switch used.

In FIG. 3, each node 31, 33, 35, 37 and 39 comprises a transmitter/receiver pair 41. Further, each node comprises a first optical switch 43 connected to the transmitter output of the transmitter/receiver pair 41 and a second optical switch 45 connected to the input of the receiver part of the transmitter/receiver pair. The first and second optical switches are 1×N optical switches as opposed to N×N optical switches as previously described.

In the network of FIG. 3, time-divisional multiplexing allows key distribution between all nodes in network with N transmitter/receiver units. It should also be noted that the optical switches 43 and 45 can be in a housing with the quantum transmitter and receiver or outside this housing. The switch can be configured by Software Defined Network controller.

Figure 4A:
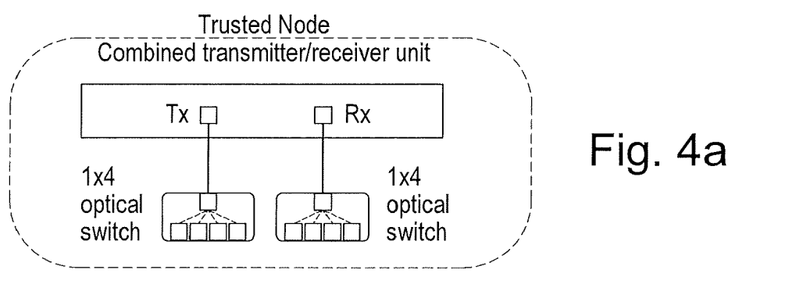
FIG. 4(a) is a schematic of a node for a quantum communication system in accordance with an embodiment, having two 1×4 optical switches.
Figure 4B:
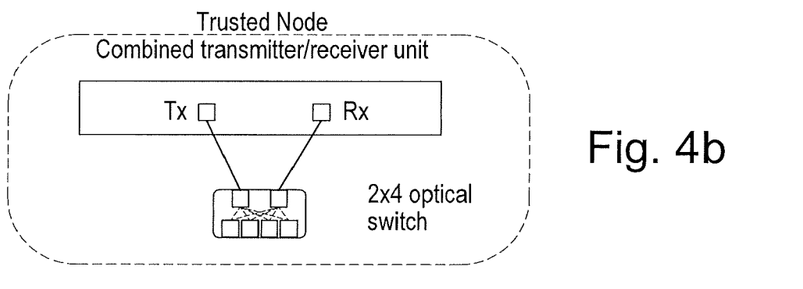
FIG. 4(b) is a schematic of a node for a quantum communication system in accordance with an embodiment, having one 2×4 optical switch.
Figure 4C:
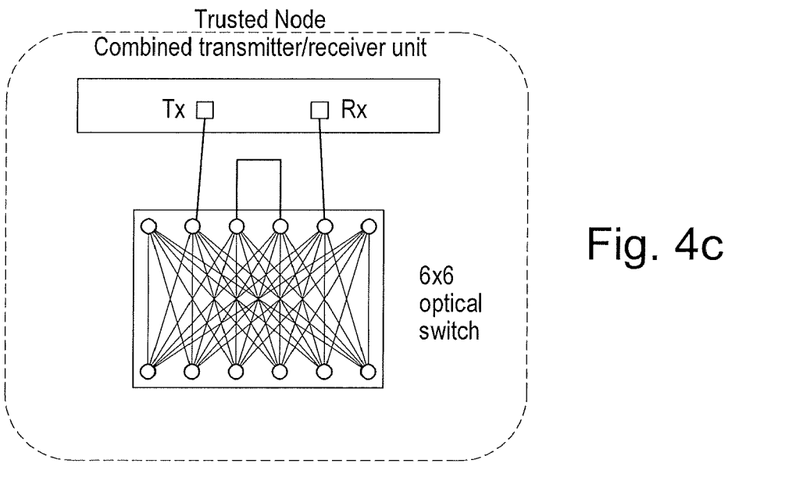
FIG. 4(c) is a schematic of a node for a quantum communication system in accordance with an embodiment, having one 6×6 optical switch.

Different types of optical switches can be used. FIGS. 4(a) to 4(c) show possible configurations of optical switches that can be used in the networks described with reference to FIGS. 2 and 3 above.

FIG. 4(a) shows two (1×N) switches of the type used in the network of FIG. 3. The two switches could also be combined into one (2×2N) switch.

FIG. 4(b) shows a further variation with one (2×N) switch.

FIG. 4(c) shows an (N×N) switch. Here, at the first side of the switch, two of the ports are connected, this allows an optical bypass of node to be formed, i.e. a pathway through the node where the signal is not decoded and re-encoded.

These switches can be controlled by software and may be based on beam steering or MEMs.

Figure 5:
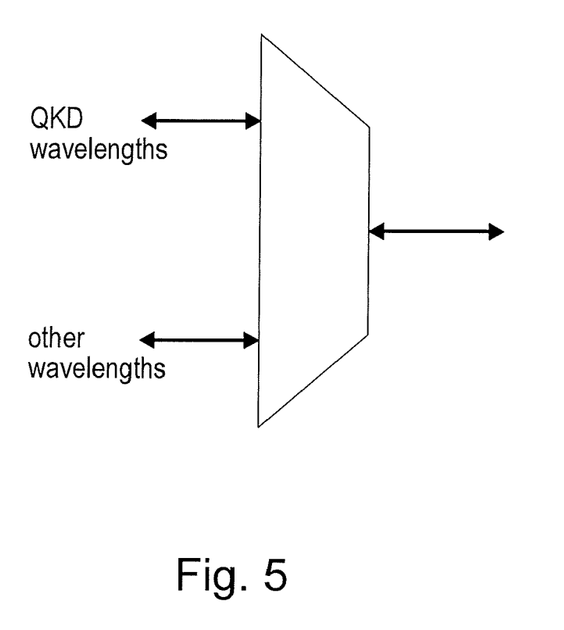
FIG. 5 is a wavelength division multiplexer for use with a node in accordance with an embodiment.

As noted above, in some embodiments, in addition to QKD data, a classical signal might also be sent. Such a classical signal can be filtered before reaching the quantum components using the apparatus of FIG. 5. FIG. 5 is a schematic of a wavelength filter for QKD wavelengths, including quantum channel and its servicing channels.

Figure 6:
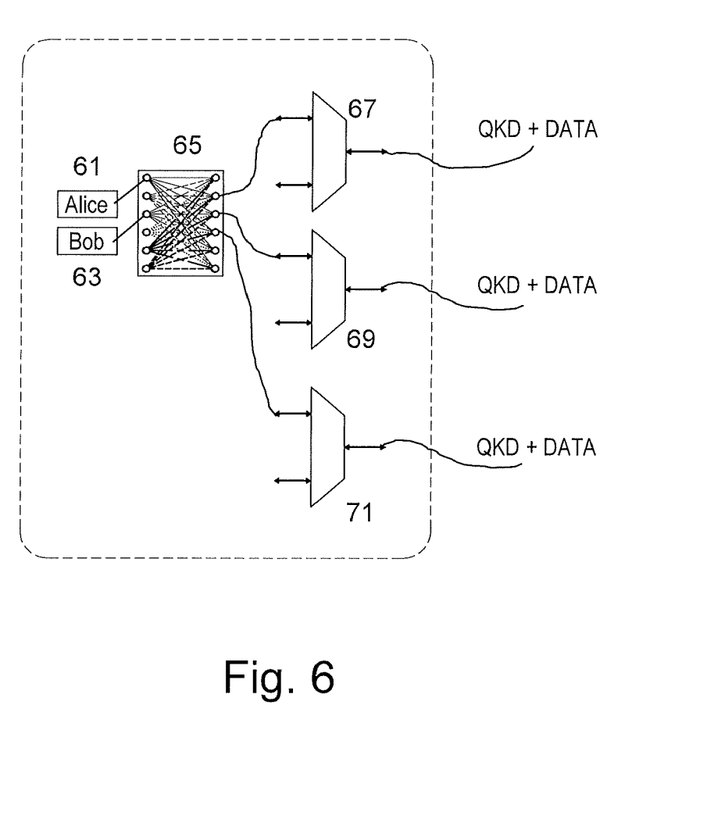
FIG. 6 is a schematic of a node in accordance with an embodiment having a plurality of wavelength division multiplexers.

FIG. 6 in some networks, QKD and other communication data may exist in the same fibre linking two nodes. To allow their coexistence, wavelength filter may be used at the edge of the node. This filter can add/drop QKD signals, including the quantum signal and the QKD servicing classical signal. The servicing signal consists of clock synchronisation and classical sifting data communication that will be described in more detail with reference to FIG. 8.

In detail, the node of FIG. 6 has a quantum transmitter Alice, 61 and the quantum receiver Bob, 63. These are connected as described above to optical switch 65. Optical switch 65, in this particular example, has outputs to first wavelength division multiplexing 67, second wavelength division multiplexing 69 and third wavelength division multiplexing 71.

In this particular example, the output from Alice 61 can be switched via the optical switch 65 to the first wavelength division of any multiplexer, 67, 69 or 71. Here, quantum data from Alice is multiplexed with classical information that is to be sent to a further node.

Equally, the quantum receiver Bob 63 can be switched via the optical switch 65 to establish a connection with a remote quantum transmitter via a wavelength multiplexer among 67, 69, and 71.

In an embodiment, time division multiplexing is used. This means that the QKD signal from the second wavelength division multiplexer 69 and the third wavelength division multiplexer 71 do not arrive at the optical switch 65 at the same time. The optical switch 65 can be controlled in accordance with the received signals to direct the correct incoming signal to Bob 63 at the correct time.

Figure 7:
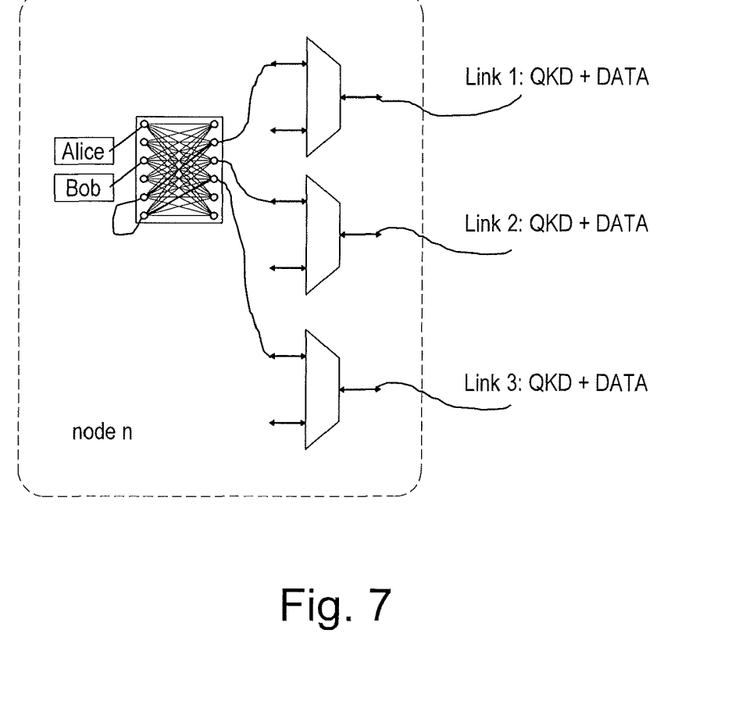
FIG. 7 is a schematic of a node in accordance with an embodiment having a plurality of wavelength division multiplexers and a bypass path.

FIG. 7 shows a variation on the apparatus of FIG. 6. Here, in this node "n", there are three links to other nodes. The peers at the other ends of Links 1 and 3 wish to perform QKD while there is no direct link. A QKD link can be created between them using their joint link node "n", i.e., by bypassing the node "n" using the optical switch. In this example, both links are placed on the same side of the switch, and the switch between them requires four ports and assistance of a fibre jump.

Huber+Suhner Polatis supplies optical matrix switches (series 6000i), which can be configured to have any-to-any capability. It features low switch losses ranging from 0.5 to 2.2 dB. It has support of Software-Defined Networks (SDNs) via embedded OpenFlow, NETCONF and RESTCONF control interfaces, the Series 6000i interfaces directly with cutting edge cloud-based network and infrastructure testing applications.

For completeness, there follows a description of a QKD system which can be applied to any of the embodiments.

Figure 8:
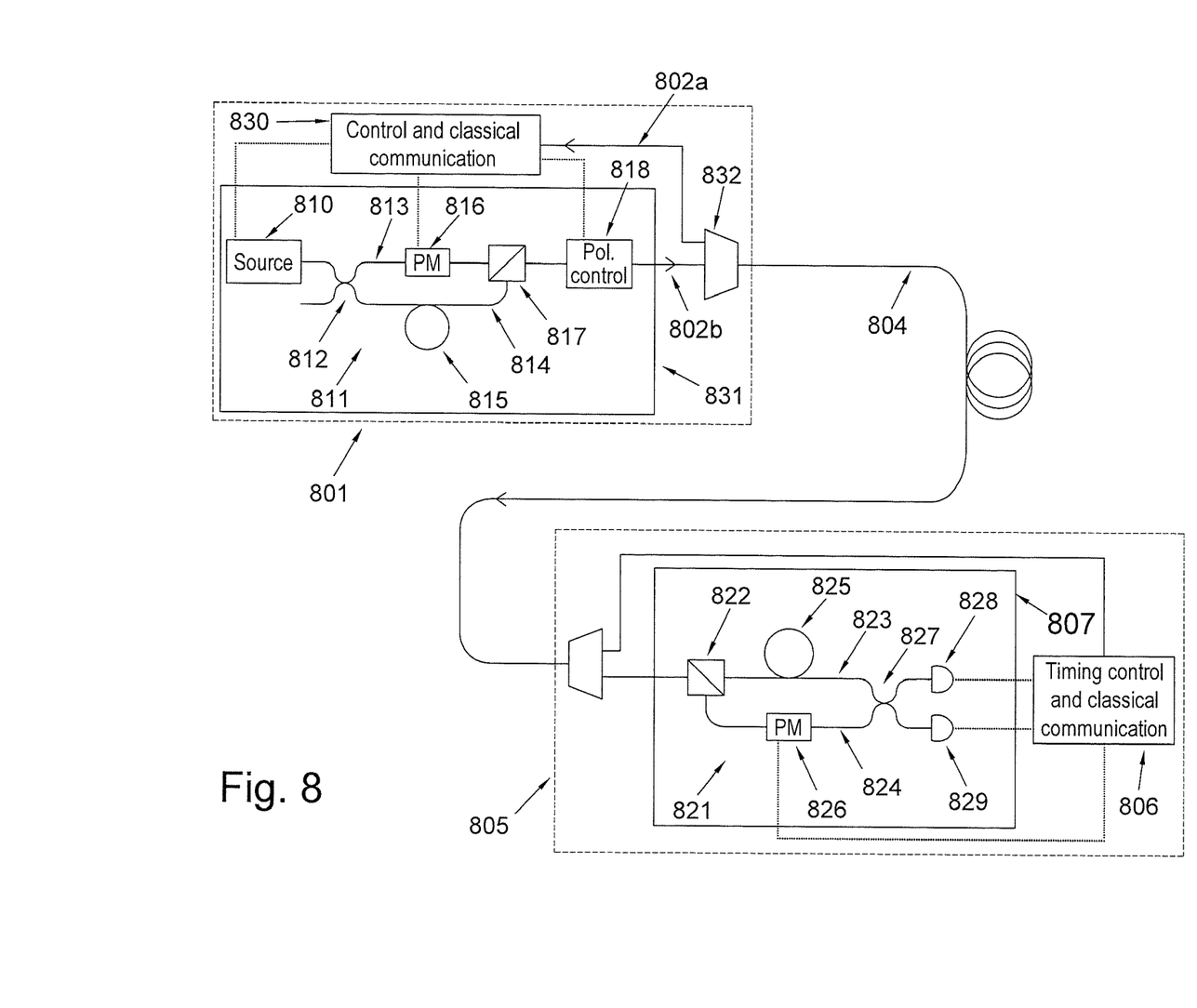
FIG. 8 is a schematic of a quantum communication system.

FIG. 8 is a schematic illustration of a quantum communication system in accordance with an embodiment, where the quantum transmitter 831 and the quantum receiver 807 are based on asymmetrical Mach-Zehnder interferometers (MZI). Transmitter unit 801 comprises quantum transmitter 831 and classical communication device 830. Receiver unit 805 comprises quantum receiver 807 and classical communication device 806. Quantum transmitter 831 and quantum receiver 807 are connected through fibre 802-1b, wavelength division multiplexer 832, and fibre channel 804. Classical communication device 830 and classical communication device 806 are connected through fibre 802a, wavelength division multiplexer 832 and fibre 804. This is referred to as the classical channel.

Photon source 810 inside quantum transmitter 831 generates a quantum signal, comprising pulses of light. The pulses are then encoded using the asymmetrical MZI 811. The pulses are directed into a beam splitter 812. One output of the beam splitter 812 is connected to a phase modulator 816. The output of the phase modulator 816 is connected to polarising beam splitter 817. This forms the short arm 813 of the interferometer. The other output of the beam splitter 812 is connected to a fibre loop 815, which is in turn connected to polarising beam splitter 817. This forms the long arm 814 of the interferometer. Light pulses travelling the long arm 814 are delayed with respect to light pulses travelling the short arm 813.

Quantum transmitter 831 may also comprise an intensity modulator configured to vary the intensity of light pulses. The intensity modulator may be configured to realise a decoy-state QKD protocol, in which pulses of different intensities are sent which allows the sender and receiver to determine the presence of an eavesdropper by measuring the number of pulses which have been safely received with the different intensities. The transmitter may comprise more than one intensity modulator.

Phase modulator 816 is configured to apply a modulation to the phase of a light pulse travelling the short arm 813. A phase modulator can comprise a crystal waveguide, such as a LiNbO$_3$ crystal waveguide, in which the refractive index is a function of electric field strength. Alternatively the phase modulation can be provided by passive means, for example, a plurality of fixed phase elements which are each configured to apply a different fixed phase difference and a switch configured to select each of the said components.

The polarisation of a light pulse travelling from the short arm 813 of the interferometer is flipped by the polarizing beam splitter 817, from a first polarisation to a second polarisation, which is orthogonal to the first polarisation.

The quantum transmitter 831 therefore generates coherent double pulses with a chosen phase difference and orthogonal polarization travelling down the fibre link 804. A polarisation controller 818 corrects any deviation of the polarisation of the pulses. Each quantum transmitter at each ONU may use a separate polarisation controller to align the polarisation of the pulses arriving at the receiver individually. The quantum transmitters may be pre-compensated. Alternatively, a single polarisation controller could be installed at the receiver side.

Quantum light pulses exit the quantum transmitter 831 and are sent via fibre 802-1b to wavelength division multiplexer 832. The quantum signals are transmitted with a first wavelength. Wavelength division multiplexer 832 sends signals inputted from fibre 802-1b into fibre 804. The quantum signals are sent via fibre 804 to the quantum receiver 807.

In the quantum receiver 807 the pulses are decoded using the asymmetrical MZI 821. The short arm 824 of the interferometer 821 comprises a phase modulator 826, such as has been described previously. The long arm 823 of the interferometer comprises a fibre loop 825, which exactly matches the fibre loop 815 in the transmitter. The long arm 823 and the short arm 824 are each connected to one of the outputs of the polarizing beam splitter 822 and to one of the inputs of beam splitter 827.

The polarizing beam splitter 822 sends a light pulse that enters with the second polarization down the long arm 823 of the interferometer and a light pulse that enters the polarizing beam splitter with the first polarization down the short arm 824. The polarization of a pulse travelling through the polarizing beam splitter 822 with the second polarisation is flipped to the first polarisation.

The outputs of beam splitter 827 are connected to photon detectors 828 and 829. Depending on the phase modulation applied at the transmitter 831 and the receiver 807, a signal will either be detected in photon detector 828 or in photon detector 829. Photon detectors 828 and 829 may be gated single-photon detectors which may be based on avalanche photo-diodes and specifically may be based on InGaAs avalanche photo-diodes. The detectors may be gated detectors such as self-differencing detectors. Self-differencing detectors perform time-filtering automatically. Time-filtering is possible due to the known arrival times of the quantum signals. The detector can be only activated during times photons are incident on the detector. Self-differencing may decrease the Raman noise by a factor of about 10.

Using phase modulator 816 and phase modulator 826 a Quantum Key Distribution protocol such as BB84 can be realized. In the BB84 protocol, Alice (at the transmitter 831) selects a phase value at random from four equally spaced phase values. For example, Alice can randomly set the phase modulator 816 to one of four different values, corresponding to phase shifts of 0, $$\frac{\pi}{2},$$

$\pi$, and $$\frac{3\pi}{2}.$$

0 and $\pi$ are associated with bits 0 and 1 in a first encoding basis, while $$\frac{\pi}{2}$$

and $$\frac{3\pi}{2}$$

are associated with 0 and 1 in a second encoding basis.

Bob (at the receiver 807) can randomly set the phase modulator 826 to one of two values, corresponding to a phase shift of 0 or $$\frac{\pi}{2}.$$

This amounts to selecting between the first and second measurement bases, respectively. In other words, Alice's 0 and $\pi$ values are compatible with Bob's 0 value (first basis), and Alice's $$\frac{\pi}{2}$$

and $$\frac{3\pi}{2}$$

values are compatible with Bob's $$\frac{\pi}{2}$$

value (second oasis).

A phase difference of 0 (i.e. the phase shift applied by Alice is 0 and the phase shift applied by Bob is 0 or the phase shift applied by Alice is $$\frac{\pi}{2}$$

and the phase shift applied by Bob is $$\frac{\pi}{2}),$$

leads to a detection at detector 828. If, on the other hand, there is a phase difference of π (i.e. the phase shift applied by Alice is π and the phase shift applied by Bob is 0 or the phase shift applied by Alice is $$\frac{3\pi}{2}$$

and the phase shift applied by Bob is $$\frac{\pi}{2})$$

there will be a detection at detector 829. For any other value of difference between the phase modulation applied at the two phase modulators, there will be a finite probability that a photon may output at detector 828 or detector 829.

Neither Alice nor Bob knows what values the other chooses or will choose when choosing their values. Only afterwards do they compare whether they used the same basis, and then only use the values for the final key where they used the same basis. The results from any measurements performed using a different basis are discarded. This process is known as sifting.

The quantum signals with regular arrivals are detected by the detectors 828 and 829 in the quantum receiver 807. Following each detection event, the transmitter which sent the photon is identified from the arrival time of the photon. Then, the receiver 807 initiates the sifting process by communicating the time arrival and decoding basis with the identified transmitter, from the classical communication device 806 to classical communication device 830. Repeating this process for each detected photon, each one of the transmitters will form a sifted key sequence with the receiver 807 with lengths of, for example, at least a few thousands bits. Then, the transmitter and the receiver can start error correction and privacy amplification processes to distil a perfectly secret key between them. The classical communication device 806 may be responsible for classical communication between the transmitter and the receiver for error correction and privacy amplification.

The system of FIG. 8 is an example of how to implement a QKD network with multiple transmitters sharing a single receiver using the BB84 protocol. Other quantum communication protocols and optical setups can also be implemented, for example, coherent-one-way protocol or differential phase shift protocol.

In an embodiment, classical signals sent between the classical communication device 830 and the classical communication device 806 are sent at a second wavelength, which is different to the first wavelength at which the quantum signals are transmitted. WDM couplers (also referred to as WDM modules or wavelength filters) may be based on thin-film wavelength filters. A first filter reflects or transmits a selected wavelength and lets all other wavelengths pass. The remaining light is sent onto a second filter, which reflects or transmits a second selected wavelength and lets all other wavelengths pass, and so on. Other types of WDM modules may be based on arrayed waveguide gratings (AWGs). These may be integrated on a chip and use interference to direct light of a selected wavelength into a selected waveguide.

The system operates at a single clock frequency. A synchronisation channel is realised through the classical channel, which is connected between classical communication device 806 and splitting unit 803. A synchronisation signal such as a master clock signal may be sent over the classical channel. Alternatively, no separate synchronisation signal is sent, but the clock is recovered from the classical data stream.

In an embodiment, a timing control module in the receiver provides a master clock signal to which each transmitter is synchronised. The master clock signal is transmitted from the classical communication device 806 to the classical communication device 830 in the transmitter unit. At any receiver clock period, at most one transmitter is allowed to transmit a pulse encoded with quantum information. The master clock signal allows the receiver to identify which transmitter has transmitted the pulse which it has just received.

The quantum source in each transmitter can be controlled such that the output of quantum light pulses is delayed to produce a combined optical signal after the splitting unit 803. The combined optical signal is a train of pulses with time intervals regulated by the receiver's master clock. Time slots for each emission for each transmitter can be pre-agreed between the transmitters and the receiver to avoid collision of pulses. To achieve this, the timing control module in the receiver unit 805 can allocate time slots to each transmitter unit, and each transmitter unit then transmits a pulse in turn with 1/N of the master clock frequency. Alternatively, each quantum transmitter may transmit a number of pulses, or an entire quantum key in turn. The time slot allocation occurs over the classical channel. Classically, the data is transmitted in frames. These frames can contain management data, which for example tells which ONU is allowed to transmit when.

The timing control module in the receiver may provide the system master clock, drive the phase modulator 826 and gated detectors 829 and 828 in the quantum receiver 807, and accept photon detection results from the detectors 829 and 828. The master clock signal is sent from the timing control module to the classical communication device 806 and then transmitted to classical communication device 830. Transmission of the master clock is realized optically using the classical channel.

The master clock may be determined by the speed of the single photon detectors in the quantum receiver 807. For example, for self-differencing InGaAs APDs based single photon detectors, the master clock can be operated at 1 GHz or higher. The master clock may be transmitted at a wavelength that is different from any of the quantum signals from the transmitters.

The transmitter unit 801 comprises a classical communication device 830 and a quantum transmitter 831. The classical communication device 830 generates the master clock signal transmits to the classical communication device 806.

During each trigger signal from the control electronics, the source 810 outputs one optical pulse. An intensity modulator may modulate the intensity of each pulse on a pulse-by-pulse basis. Alternatively, direct modulation can be realized by varying amplitude of driving signals applied to the photon source 810.

The signal pulses are then fed into the Mach-Zehnder interferometer 811. The length difference between the two arms of the Mach Zehnder interferometer 811 corresponds to an optical propagation delay of $t_{delay}$. A photon travelling through the long arm 814 will lag a photon travelling through the short arm 813 by a time of $t_{delay}$ at the exit of the interferometer 811.

A trigger signal from the control unit may also be used to control timing of the phase modulator 816, such that a phase modulation is applied when a light pulse is present.

The quantum light pulses are then transmitted to the receiver 807 along fibre 804. The quantum receiver 807 receives the transmitted quantum signal from the splitting unit 803. The signal pulses are fed into the interferometer 821. The polarising beam splitter 822 divides the incident pulses with orthogonal polarisations. The phase modulator 826 may also be synchronised with the arrival time of the photons, using the master clock.

Due to the use of polarising components, there are, in ideal cases, only two routes for a signal pulse travelling from the entrance of the encoding interferometer 811 to the exit of the decoding interferometer 821:
  i. Long Arm 814-Short Arm 824 (L-S) and
  ii. Short Arm 813-Long Arm 823 (S-L).

A variable delay line may be included in one of the interferometers, and adjusted to make the propagation time along routes (i) and (ii) almost equal, within the signal laser coherence time which may be a few picoseconds. This will ensure interference of the two paths.

The master clock signal may also be used to control the detectors, such that the detectors are gated on during the arrival of those photons that experience interference, i.e., photons travelling through the short arm of one interferometer and the long arm of the other interferometer.

Due to non-ideal polarisations, some photons travel either both short arms or both long arms, thus arriving at the detectors 828 and 829 with a time delay of $\pm t_{delay}$ respective with interfering photons. These non-interfering photons do not contribute to the key generation of key rate. Therefore, detection results of these photons should be discarded.

In order to avoid contamination of interfering photons, appropriate $t_{delay}$ may be chosen to ensure that (1) $t_{delay}$ is longer than the detector time resolution and (2) $t_{delay}$ is shorter than the receiver's system clock period. In one embodiment, $t_{delay}$ is half of the system clock period. For example, for a 1 GHz receiver, $t_{delay}$ is 500 picoseconds.

During quantum communication, a number of physical parameters may be actively stabilized, including the arm length matching between asymmetric Mach-Zehnder interferometers, the photon polarisation, and the photon arrival times. Active stabilisation can be realised by a feedback control unit at the quantum receiver, configured to generate a feedback signal. This feedback signal is then transmitted by the classical communication device 806 to the classical communication device 830. A control unit in the transmitter unit 801 then controls a component or components of the quantum transmitter based on the feedback signal.

Arm length matching can be realised through actively adjusting a tuneable delay line in the transmitter interferometer based on a feedback signal transmitted through the classical channel from the receiver. The feedback signal can be the quantum bit error ratio (QBER). This can be minimised by tuning the tuneable delay line. In other words, the control unit in the quantum transmitter adjusts the tuneable delay line in the MZI each time the QBER feedback signal is received, in order to minimise the QBER.

The QBER is available to send to the transmitter only after each error correction process. The latency in determining the QBER allows compensation of only slow variation of arm lengths.

It is possible to achieve faster compensation, by sending strong reference pulses through the quantum channel from the transmitter, substituting a small fraction of signal/decoy pulses. These reference pulses are not modulated in phase, and therefore the degree of interference of the reference pulses will indicate the status of the arm length matching. Detection results of the reference pulses can be transmitted to the transmitter through the classical channel by to be used as a feedback to adjust the tuneable delay line.

The tuneable delay line acts as a control element. It may be an air-gap, or a fibre stretcher, driven by a piezo-electric actuator.

Alternatively, the two delays can be balanced by carefully controlling the length of fibre in the two interferometers. Fine adjustment of the length of the two optical paths can be achieved through either tuning the DC bias in the phase modulator in the transmitter, or adding an AC offset to the driving signal applied to the phase modulator.

Alternatively, arm length matching can be realised by adjustment of components in the receiver, for example a tuneable delay line, or the phase modulator. A different adjustment must be applied according to the origin of each incoming pulse.

The polarisation drift can be actively stabilized using the polarisation controller 818. Ideally, all photons passing through the encoder and decoder experience interference at the beam splitter 827 and contribute to the key formation. However, polarisation drift in fibre channel 804 will cause photons be routed to the non-interfering paths, such as photons passing through either both long arms or short arms of the two interferometers. These non-interfering photons do not contribute to the key formation. They are automatically rejected in the case with gated photon detectors, or can be rejected using a timing discrimination window in the detector subsystem with free-running single photon detectors. In either case, polarisation drift reduces the photon count rate of interfering photons. By optimising this count rate by adjusting the polarisation controller this drift can be corrected for. In other words, the count rate is transmitted from the classical communication device 811 to the classical communication device 802. The control unit in the transmitter unit 801 then adjusts the polarisation controller 818 in order to maximise the count rate.

The photon arrival time at the detectors 829 and 828 can also be corrected for by tuning the trigger time of the photon source 810 based on the photon detection results. In other words, the photon detection results, such as the count rate and QBER, are transmitted from the classical communication device 811 to the classical communication device 802. The control unit in the transmitter unit then adjusts the trigger time of the photon source 810 in order to optimise the photon detection results.

Figure 9:
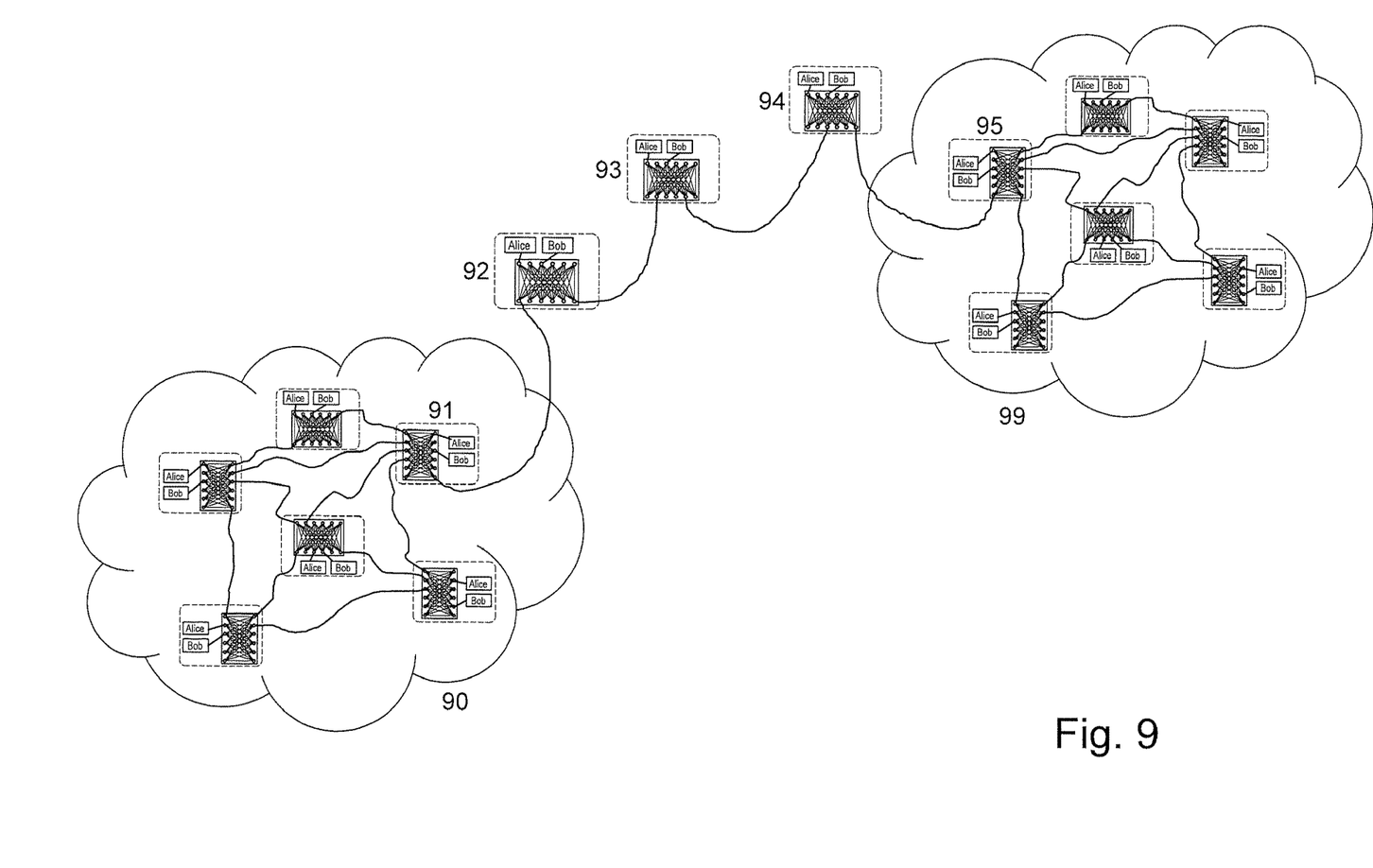
FIG. 9 is a schematic of a quantum communication system in accordance with an embodiment.

FIG. 9 is a schematic of a real world example for the above described agile networks. Two mesh-type QKD networks, 90 and 99, are linked together with a one-dimensional chain of QKD nodes. To form a secure key between two nodes located in separate mesh networks, the intermediate nodes between the two mesh networks have to be used. For example, to form a secure key between 91 and 95, the intermediate nodes 92, 93, and 94 have to be used. Conventionally, all these nodes have to be trusted. Compromise in one of these nodes will prevent secure communication between the two mesh networks 90 and 99. Embodiments of the present invention can be used to circumvent this problem. Although each intermediate link just serves two links, it remains beneficial to have an optical switch installed in each intermediate node. The optical switch allows bypassing an intermediate node on demand and can be used to enhance the network security. For example, to form a secure key between node 91 in the first mesh network and node 95 in the second mesh network 99, it is possible to create three different communication paths: (i) 91→93→94→95; (ii) 91→92→94→95; and (iii) 91→92→93→95. Each intermediate node is bypassed at least once. It is then possible to form a final key between node 91 and 95, by combining three sets of keys obtained from different paths, $K=K_{(i)} \oplus K_{(ii)} \oplus K_{(iii)}$.

The above examples described herein relate to QKD systems based on weak coherent pulses (WCP) and single photon detection. However, the general idea of optically switched network is applicable to other type of QKD systems, including those based on (i) single photon prepare and measurement, (ii) quantum continuous variable (CV) prepare and measure and (iii) entangled photon pairs. For (i) and (ii), an arrangement of optical switches that is identical to those based on weak-coherent-pulses and single photon detection described above can be used.

For (iii) entanglement photon pair based systems, the same optical switching scheme can be used when one of the communication parties contains both the photon pair source and one set of measurement setup.

Although the above embodiments have described a mesh network, the embodiments described herein can apply to other type of networks, such as ring and access networks.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A quantum communication network, said quantum communication network comprising:
a first node and at least two other nodes, wherein each node includes
a quantum transmitter, said quantum transmitter being configured to encode information on weak light pulses;
a quantum receiver, said quantum receiver being configured to decode information from weak light pulses;
at least three ports configured to communicate with at least one other node; and
an optical switch,
said optical switch being configured to selectively connect the quantum transmitter and receiver to the ports such that the switch controls which of the ports is in communication with the quantum transmitter and the quantum receiver, and
the first node has at least two links to other nodes, the two links being connected to the optical switch of the first node such that signals transmitted over the two links are switchably connected to a same quantum receiver and quantum transmitter.

2. The quantum communication network according to claim 1,
wherein the optical switch comprises a first optical sub-switch and a second optical sub-switch,
wherein the first optical sub-switch is an 1XN switch, where N is an integer of at least 2, where a single input can be selectively coupled to one of N outputs, the single input being configured to receive a signal from the quantum transmitter and the N outputs coupled to one of the said ports,
wherein the second optical sub-switch is an MX1 switch, where M is an integer of at least 2, where a single output can be selectively coupled to one of M inputs, the single output being configured to direct a signal to the quantum receiver and the M inputs each coupled to one of the said ports.

3. The quantum communication network according to claim 1, wherein the optical switch is a 2XP switch, where P is an integer of at least 3, the optical switch having a first interface that has two ports and a second interface that has P ports, the first interface having one port that is configured to receive a signal from the quantum transmitter and a second port that is configured to output a signal towards the quantum receiver, the first and second ports of the first interface being switchably connected to any of the ports of the second interface.

4. The quantum communication network according to claim 1, wherein the optical switch is an RXQ switch, where R is an integer of at least 4 and Q is an integer of at least 2, the optical switch having a first interface that has R ports and a second interface that has Q ports, the first interface having one port that is configured to receive a signal from the quantum transmitter and a second port that is configured to output a signal towards the quantum receiver, the first and second ports of the first interface being switchably connected to any of the ports of the second interface.

5. The quantum communication network according to claim 4, wherein two of the ports on the first interface are connected such that a signal received at a first port on the second interface can be directed via the connected ports on the first interface to a second port on the second interface.

6. The quantum communication network according to claim 1, wherein said optical switch has a loss of 6 dB or less.

7. The quantum communication network according to claim 1, wherein the optical switch is a software controlled optical switch.

8. The quantum communication network according to claim 1, wherein the optical switch is configured to selectively couple the quantum transmitter and the quantum receiver to the ports of the node via beam steering.

9. The quantum communication network according to claim 1, wherein the optical switch is a MEMs optical switch.

10. The quantum communication network according to claim 1, further comprising a wavelength division multiplexer, said wavelength division multiplexer configured to separate an incoming signal into a quantum signal to be directed towards the optical switch and a classical signal to be directed to a component other than the optical switch.

11. The quantum communication network according to claim 1, further comprising a wavelength division multiplexer, said wavelength division multiplexer configured to combine an incoming quantum signal from the optical switch and a classical signal from a component other than the optical switch.

12. The quantum communication network according to claim 1, comprising a plurality of interlinked first nodes, the network further comprising a network controller configured to perform time sharing to prevent signals travelling through said network from clashing.

13. The quantum communication network according to claim 12, wherein said controller is configured to perform time sharing to allow signals that have been designated to be important to travel quicker through said network than other signals.

14. The quantum communication network according to claim 12, wherein the network controller is configured to direct a signal relating to a first quantum key from a source node to a destination node via a first set of nodes and to direct a signal relating to a second quantum key from the source node to the destination node via a second set of nodes, the first set of nodes being different from the second set of nodes, wherein a final key is produced that is a combination of the first and second keys.

15. The quantum communication network according to claim 12, wherein the network controller is configured to direct a signal relating to a quantum key from a source node to a destination node, the source node and the destination node being separated by a sequence of N nodes, where N is an integer of at least 2, the controller being configured to:
divide the quantum key of length KN into N parts; and
send each part of the key via a subset of the sequence of N nodes, wherein each subset consists of N−1 of the nodes, such that each part of the key bypasses at least one of the N nodes, and
wherein a key with length K is produced by combining the N parts of the key.

16. A method of operating a quantum communication network, said network comprising a first node and at least two other nodes, wherein each node includes a quantum transmitter, said quantum transmitter being configured to encode information on weak light pulses; a quantum receiver, the quantum receiver being configured to decode information from weak light pulses; at least three ports configured to communicate with at least one other node; and an optical switch, the optical switch being configured to selectively connect the quantum transmitter and the quantum receiver to the ports such that the switch controls which of the ports is in communication with the quantum transmitter and the quantum receiver, wherein the first node has at least two links to other nodes, and the method includes connecting the two links to the optical switch of the first node such that signals transmitted over the two links are switchably connected to a same quantum receiver and quantum transmitter.

17. A method of securely transmitting a key from a source node to a destination node, wherein the source node and the destination node are separated by a sequence of N nodes, where N is an integer of at least 2, each node of the N nodes comprising an optical switch that allows an optical bypass through the node, wherein the optical bypass is a pathway through the node where signal is not decoded and re-encoded, the method comprising:

dividing the key of length KN into N parts;

sending each part of the key via a subset of the sequence of N nodes, wherein each subset consists of N−1 of the nodes, such that each part of the key bypasses through a particular node of the N nodes using the optical switch in the particular node to optically bypass the particular node; and combining the N parts of the key transmitted via the subsets of nodes to produce the key with a length K.

* * * * *